United States Patent [19]
Schlüter et al.

[11] Patent Number: 5,732,556
[45] Date of Patent: Mar. 31, 1998

[54] ACTUATION ASSEMBLY FOR A BRAKING SYSTEM FOR MOTOR VEHICLES

[75] Inventors: Peter Schlüter, Kammerforst; Albert Zinndorf, Sessenbach; Werner Schnorr, Koblenz, all of Germany

[73] Assignee: Lucas Industries public limited company, New Road Solihull, United Kingdom

[21] Appl. No.: 691,117

[22] Filed: Aug. 1, 1996

Related U.S. Application Data

[63] Continuation of PCT/EP95/00704 Feb. 27, 1995.

[30] Foreign Application Priority Data

Mar. 26, 1994 [DE] Germany ............... 44 08 993.7

[51] Int. Cl.⁶ .................................................. B60T 13/00
[52] U.S. Cl. .................................. 60/547.1; 91/376 R
[58] Field of Search ........................ 91/369.1, 369.2, 91/376 R; 60/547.1, 547.2

[56] References Cited

U.S. PATENT DOCUMENTS

| | | | |
|---|---|---|---|
| 3,172,335 | 3/1965 | Brooks et al. | |
| 5,410,880 | 5/1995 | Schluter | 60/547.1 |
| 5,475,977 | 12/1995 | Gautier et al. | 60/547.1 |
| 5,487,271 | 1/1996 | Gautier et al. | 60/547.1 X |
| 5,493,949 | 2/1996 | Castel et al. | 60/547.1 X |
| 5,537,821 | 7/1996 | Sunohara et al. | 60/547.1 |

FOREIGN PATENT DOCUMENTS

| | | |
|---|---|---|
| 3222929 | 1/1983 | Germany. |
| 3318272 | 11/1984 | Germany. |
| 3402962 | 8/1985 | Germany. |
| 3709172 | 9/1988 | Germany. |
| 3740691 | 6/1989 | Germany. |
| 2049086 | 12/1980 | United Kingdom. |
| 2077868 | 12/1981 | United Kingdom. |

Primary Examiner—Hoang Nguyen
Attorney, Agent, or Firm—Wood, Herron & Evans, L.L.P.

[57] ABSTRACT

A pneumatic brake booster (10) and a hydraulic master cylinder (60) are arranged in a series along a common axis (A) to form an assembly which includes a booster housing (12), a power input member (30) and a power output member (40). A mechanical power transmitter (32) is arranged between the power input member (30) and the power output member (40). A sleeve (50) is rigidly attached at a valve housing (22) to enclose a portion of the power output member (40). At the booster housing (12) a master cylinder housing (62) is attached which has a guide (68) facing the power transmitter (32). A primary piston (70) is guided in the master cylinder housing (62) and includes a support (72) for the power output member (40) as well as an extension (74) which extends towards the power transmitter (32) and is guided in the guide (68). The sleeve (50) extends to near this support (72) and is provided with a head portion (52) which bears against the master cylinder (60) via the guide (68) in a radial direction. These components provide for the transmission and amplification of axial forces while being subjected to only small transverse forces and bending moments, even then when they may not be in perfect alignment with each other.

2 Claims, 4 Drawing Sheets

ACTUATION ASSEMBLY FOR A BRAKING SYSTEM FOR MOTOR VEHICLES

This application is a continuation of PCT application Ser. No. PCT/EP95/00704 Feb. 27, 1995.

The invention relates to an actuation assembly according to the preamble clause of Claim 1.

In a known actuation assembly of this generic type (DE 33 18 272 A1), the sleeve which is rigidly attached to the valve housing projects only slightly into the tubular extension of the primary piston. The head portion of the sleeve therefore has a considerable axial distance from the support for the power output member, which is formed at the primary piston. With this known arrangement, axle misalignments which cannot completely be avoided during manufacture and assembly of the parts of an actuation assembly as specified in the preamble clause of Claim 1 cause the tubular extension of the primary piston to be subjected to bending moments. This is harmless insofar as the tubular extension can be so dimensioned that it is strong enough to withstand even considerable bending moments. Until now, however, the fact that an axle misalignment between the power output member and the primary piston of the master cylinder in conjunction with such bending moments can result in considerable transverse forces acting upon the primary piston and consequently impeding its axial movability and leading in premature wear has not been given due consideration. In another known actuation assembly (DE 32 22 929 A1) with a pneumatic brake booster, at the housing of which a master cylinder is mounted from the front, the power output member extends freely movable through a centre hole of a cap part which is placed on an annular front shoulder of a retaining disk which belongs to the axially movable intermediate wall of the brake booster. The output piston of the power transmitter is secured in a recess accommodating same in said disk by means of this cap part.

The invention is based on the object to make sure that in an actuation assembly of a braking system for motor vehicles with a pneumatic brake booster and a hydraulic master cylinder the components for transmission and amplification of axial forces are subjected to only small transverse forces and bending moments, even then when they have not been in perfect alignment with each other from the beginning.

The object is solved according to the invention with the characteristics of Claim 1. Advantageous further developments result from the dependent claims.

Embodiments of the invention will be explained in the following in more detail with reference to schematic drawings, in which: FIG. 1 shows an axial section of the actuation assembly according to the invention;

Figure 1:
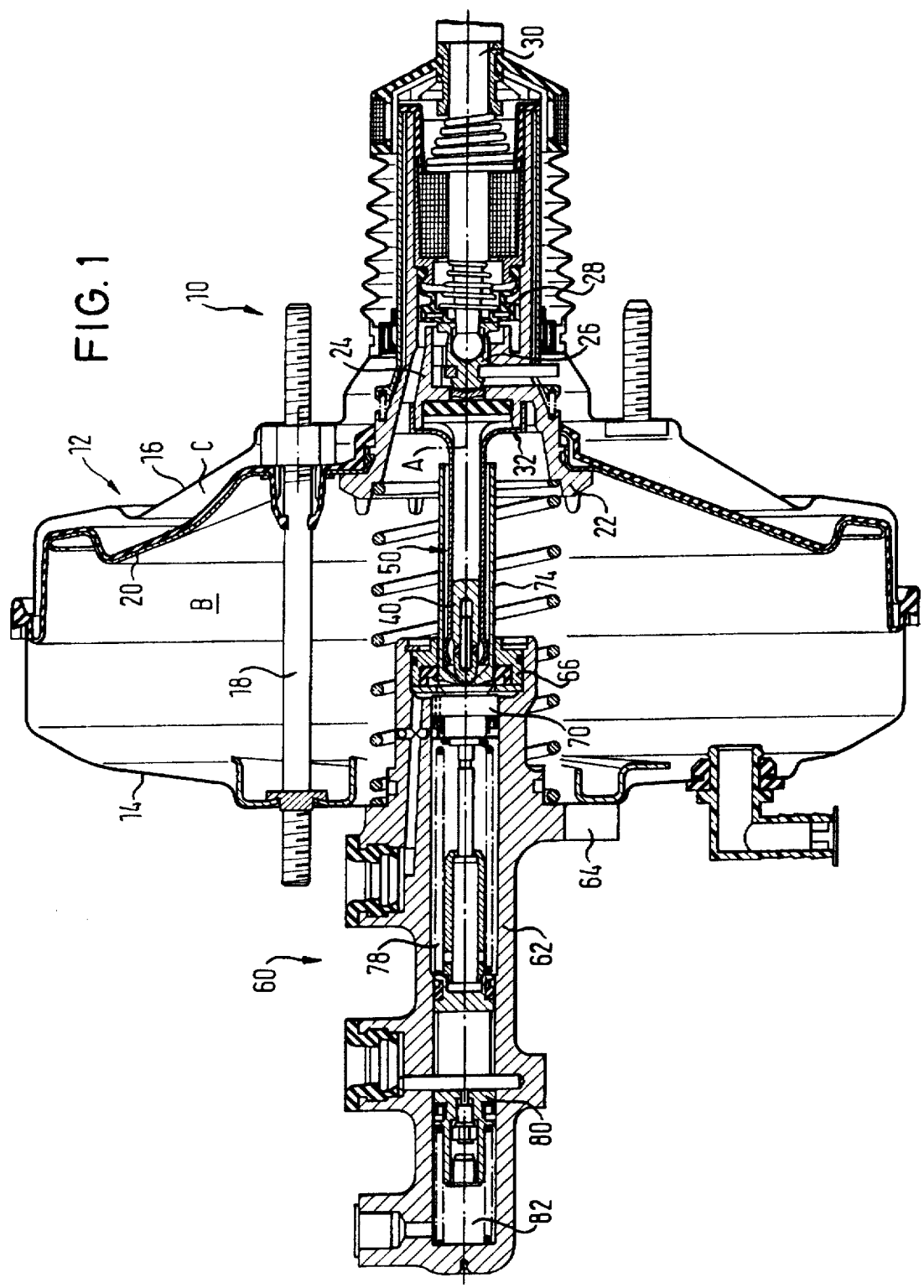
Figure 2:
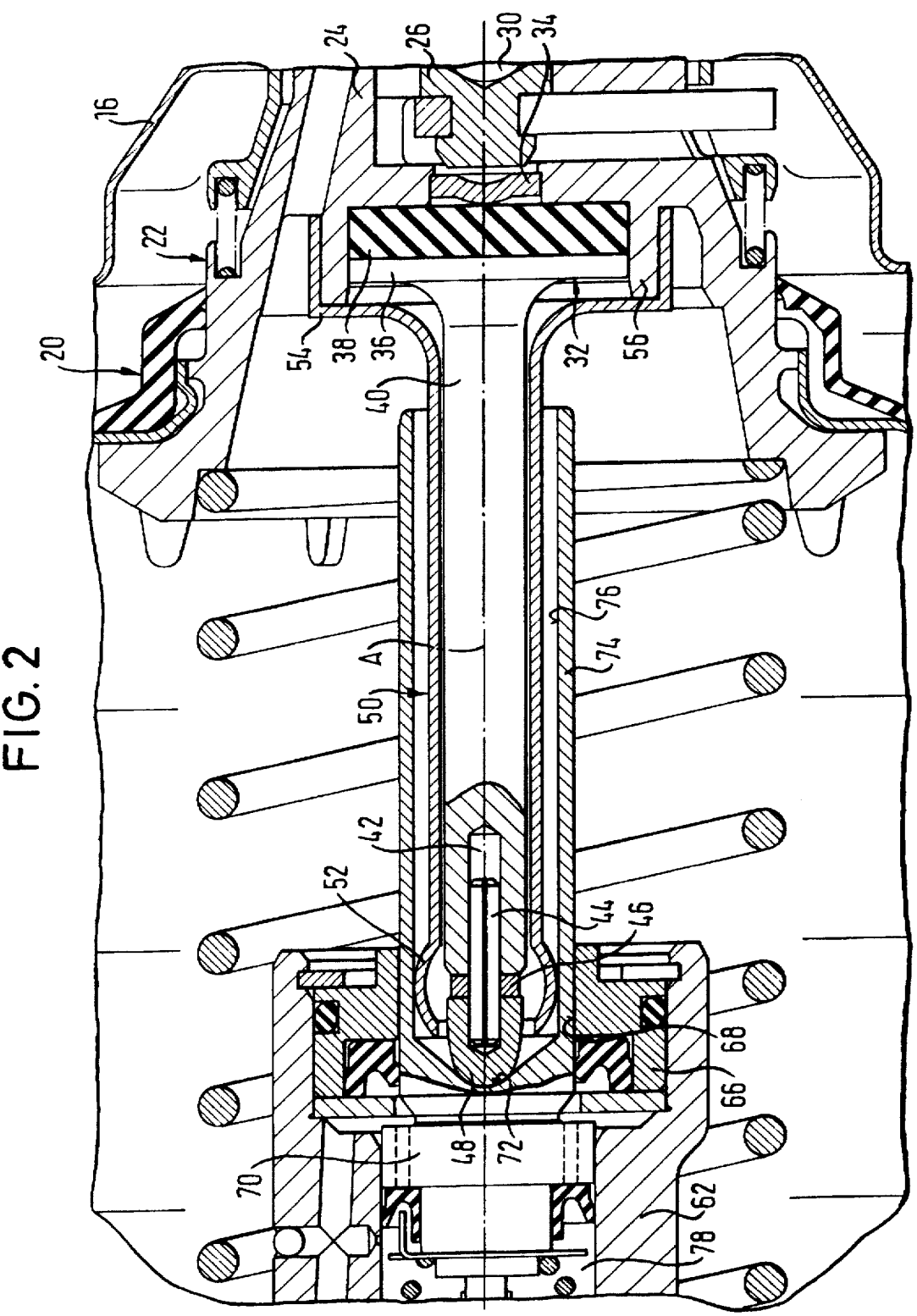
FIG. 2 shows an enlarged portion of FIG. 1.

A pneumatic brake booster 10 of an essentially conventional construction, which is essentially rotation symmetrical with respect to an axis A, is associated with the assembly shown in FIGS. 1 and 2. The brake booster 10 has a booster housing 12, consisting of a front housing part 14 and a rear housing part 16, which are clamped together by means of axis parallel tie bolts 18 and which enclose a space which is divided by an axially movable intermediate wall 20 into a front and rear chamber B and C, respectively. During operation, the front chamber B is continuously connected with a vacuum source, e.g. an intake line of an Otto engine; the rear chamber C can optionally be connected with the front chamber B or the ambient atmosphere, if required also with a compressed air source, by means of a control valve.

The control valve is also of known construction; its major components are a valve housing 22 with a central body 24, at which a radial, external, annular valve seat is formed, a valve piston 26, at which a radial, internal, annular valve seat is formed, and a sealing body 28 which cooperates with the two valve seats. For the actuation of the valve piston 26 a rod-shaped power input member 30 is introduced from the rear into the valve housing 22. In front of the valve piston 26 a mechanical power transmitter 32 is arranged which comprises an input piston 34 of a smaller diameter, an output piston 36 of a larger diameter, and a reaction disk 38 of rubber elastic material arranged between these two pistons. Upon actuation of the power in-put member 30 the mechanical power transmitter 32 increases the input power in the ratio of the areas of the output piston 36 and the input piston 34 which are in contact with the reaction disk.

The output piston 36 cooperates with a rod-shaped power output member 40 at the rear end of which it is integrally formed. Further to the front, the power output member 40 is provided with an axial hole 42 in which a spacer 46 and an end piece 48 with a rounded spherical front are secured by means of a grooved pin 44 or a similar fastening means.

Figure 3:
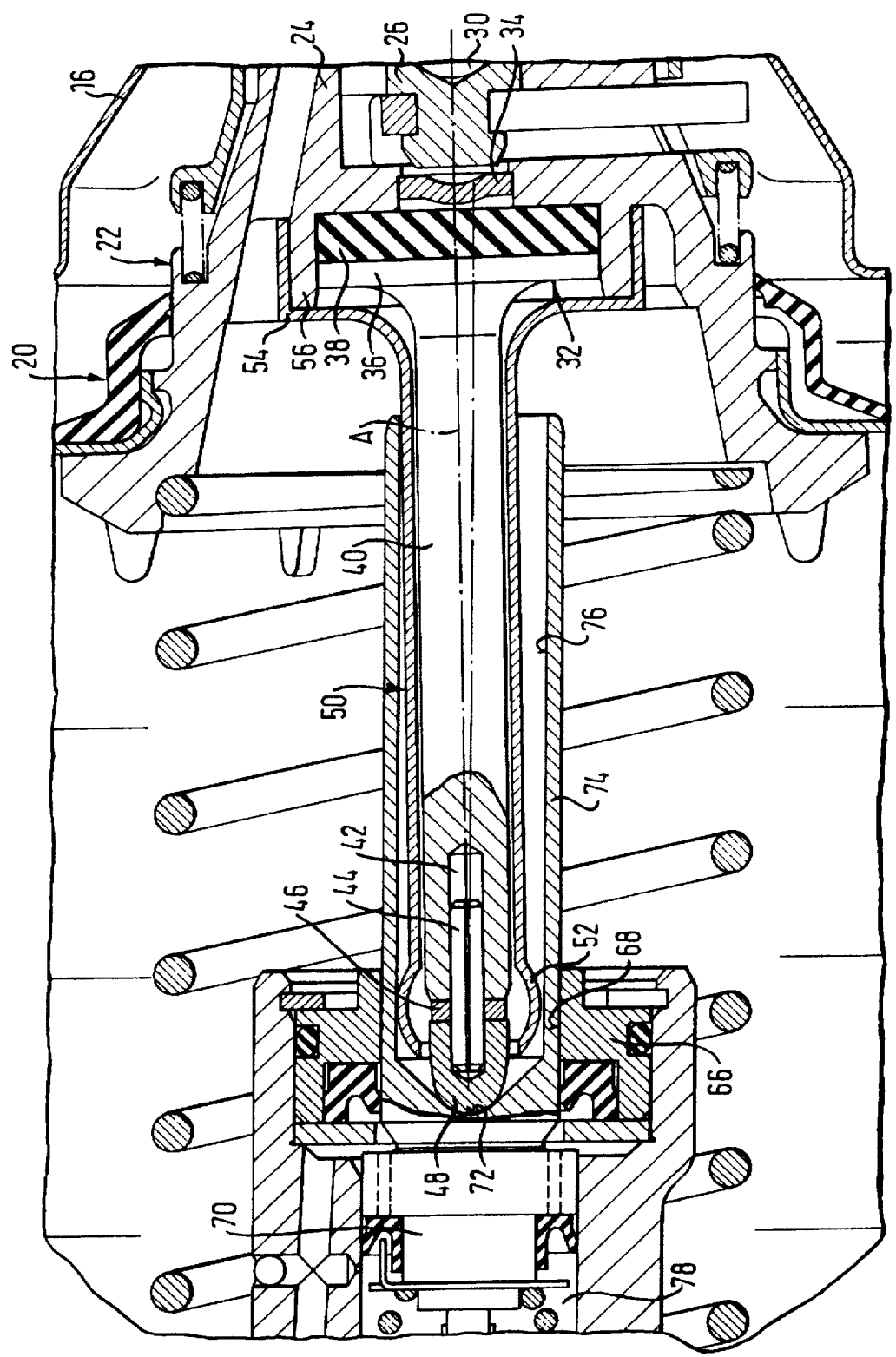
FIG. 3 shows a corresponding portion with a maximum axle misalignment.
Figure 4:
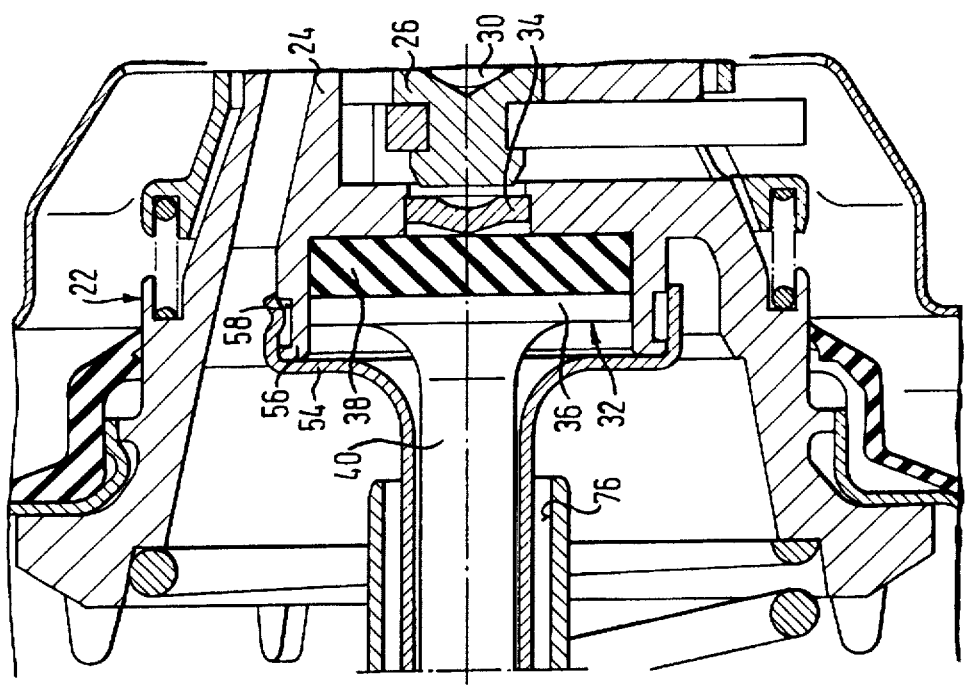
FIG. 4 shows an embodiment which is modified compared to FIG. 2.
Figure 5:
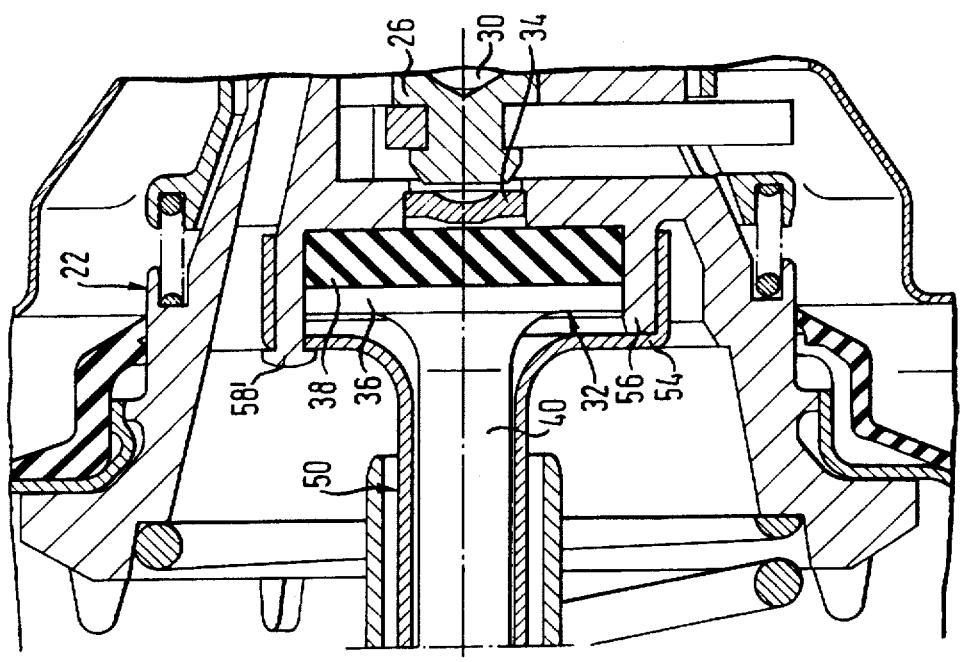
FIG. 5 shows another modification of FIG. 2.

The power output member 40 is surrounded almost along its entire length by a sleeve 50 arranged at a radial distance. The sleeve 50 terminates at its front in a spherical head portion 52 and at its rear in a pot-shaped foot 54 which encloses an annular rim 56 of the central body 24 of the valve housing 22 in a clearance-free manner. According to FIGS. 1 to 3 the foot 54 with the annular rim 56 enclosed by it form an interference fit. According to FIG. 4 the rim 56 has an annular groove 58 in its outer surface which engages the deformations of the foot 54 which extend radially inwards. According to FIG. 5, axis parallel projections 58' are formed at the annular rim 56, which extend through one hole each in the pot-shaped foot 54 to the front, and the front faces of which are caulked. The annular groove 58 and the projections 58' form additional locking means against an axial sliding of the pot-shaped foot 54 off the annular rim 56. Generally, however, the interference fit of the pot-shaped foot 54 on the annular rim 56 is so strong that the two components cannot be separated from each other.

A master cylinder 60 is arranged essentially coaxially with the brake booster 10, which comprises a master cylinder housing 62 with a flange 64. The flange 64 is fit to the tie bolts 18 and secured by means of nuts (not shown) in the illustrated position, in which the master cylinder housing extends in an axial direction into the booster housing 12. The rear end portion of the master cylinder housing 62 arranged inside the booster housing 12 comprises an end ring 66 which is installed in a tight and sealing manner and has a central hole which forms an axial guide 68. In front of the end ring 66 a primary piston 70 is guided in the master cylinder housing 62, which at its rear comprises a pan-shaped support 72. The front end piece 48 of the power output member 40 is in engagement with the latter. The spacer 46 is so dimensioned that the front end piece 48 in the illustrated rest position of the primary piston 70 rests clearance-free in its pan-shaped support 72 and is thus centered as well.

The primary piston 70 has a tubular extension 74 which from the pan-shaped support 72 extends in an axially rearward direction and terminates at a short distance only from the pot-shaped foot 54 and the power transmitter 32. The extension 74 has a circular cylindrical inner surface 76 along which the spherical head portion 52 of the sleeve 50 is guided. The head portion 52 is arranged at an only slight distance behind the pan-shaped support 72 within the space enclosed by the guide 68, and normally is the only portion of the sleeve 50 which is in contact with the tubular extension 74 of the primary piston 70. As can best be seen from FIGS. 2, 4 and 5, an annular space between the major portion of the sleeve 50 and the inner surface 76 of the extension 74 normally remains free. If, however, an axle misalignment occurs between the power output member 40 and the primary piston 70, this will be limited according to FIG. 3 to a harmless extent, because the sleeve 50 abuts the rear marginal area of the tubular extension 74 and is thus additionally guided.

According to FIG. 1 the master cylinder 60 is intended for a dual-circuit braking system. Consequently, a secondary piston 80 which defines a secondary pressure chamber 82 is arranged in the master cylinder housing 62 before the primary piston 70 and separated from it by a primary pressure chamber 78. A tandem arrangement of this type, however, does not constitute a mandatory requirement for the described design of the sleeve 50 and the components which are in immediate cooperation with it. Independent of the number of braking circuits provided, the primary piston 70 is therefore to be considered as that piston the purpose of which is to convert a force applied to it by the power out-put member 40 into a hydraulic pressure.

We claim:

1. An actuation assembly for a braking system of a motor vehicle, wherein a pneumatic brake booster (10) and a hydraulic master cylinder (60) are arranged in series along a common axis (A), comprising a booster housing (12) in which an axially movable intermediate wall (20) separates two chambers (B, C) which are connectable to two sources of different pressure;

a valve housing (22) which is connected to the intermediate wall (20) for a common axial movement;

a power input member (30) and a power output member (40) which are axially movable with respect to the booster housing (12) and the valve housing (22);

a mechanical power transmitter (32) which is arranged between the power input member (30) and the power output member (40) and which comprises an input piston (34) of a smaller diameter, an output piston (36) of a larger diameter, and a reaction disk (38) of rubber elastic material arranged between these pistons;

a master cylinder housing (62) which is attached at the booster housing (12) and comprises a guide (68) facing the power transmitter (32);

a primary piston (70) which is guided in the master cylinder housing (62) and which comprises a support (72) for the power output member (40) as well as a tubular extension (74) which extends towards the power transmitter (32) and which is guided in said guide (68);

a sleeve (50) which is rigidly attached at the valve housing (22), encloses a portion of the power output member (40) in a radial distance and has a head portion (52) which is guided along an inner surface (76) of the extension (74), characterized in that the sleeve (50) extends to near the support (72) formed at the primary piston (70) and the head portion (52) is arranged within the space enclosed by said guide (68).

2. An actuation assembly according to claim 1, characterized in that the sleeve (50) comprises a pot-shaped foot (54) which encloses an annular rim (56) of the valve housing (22) in a clearance-free manner and also encloses the power transmitter (32).

* * * * *